March 24, 1942.  M. F. MAJESTIC  2,277,123
CLOSURE FOR MEAT GRINDER
Filed Jan. 11, 1941
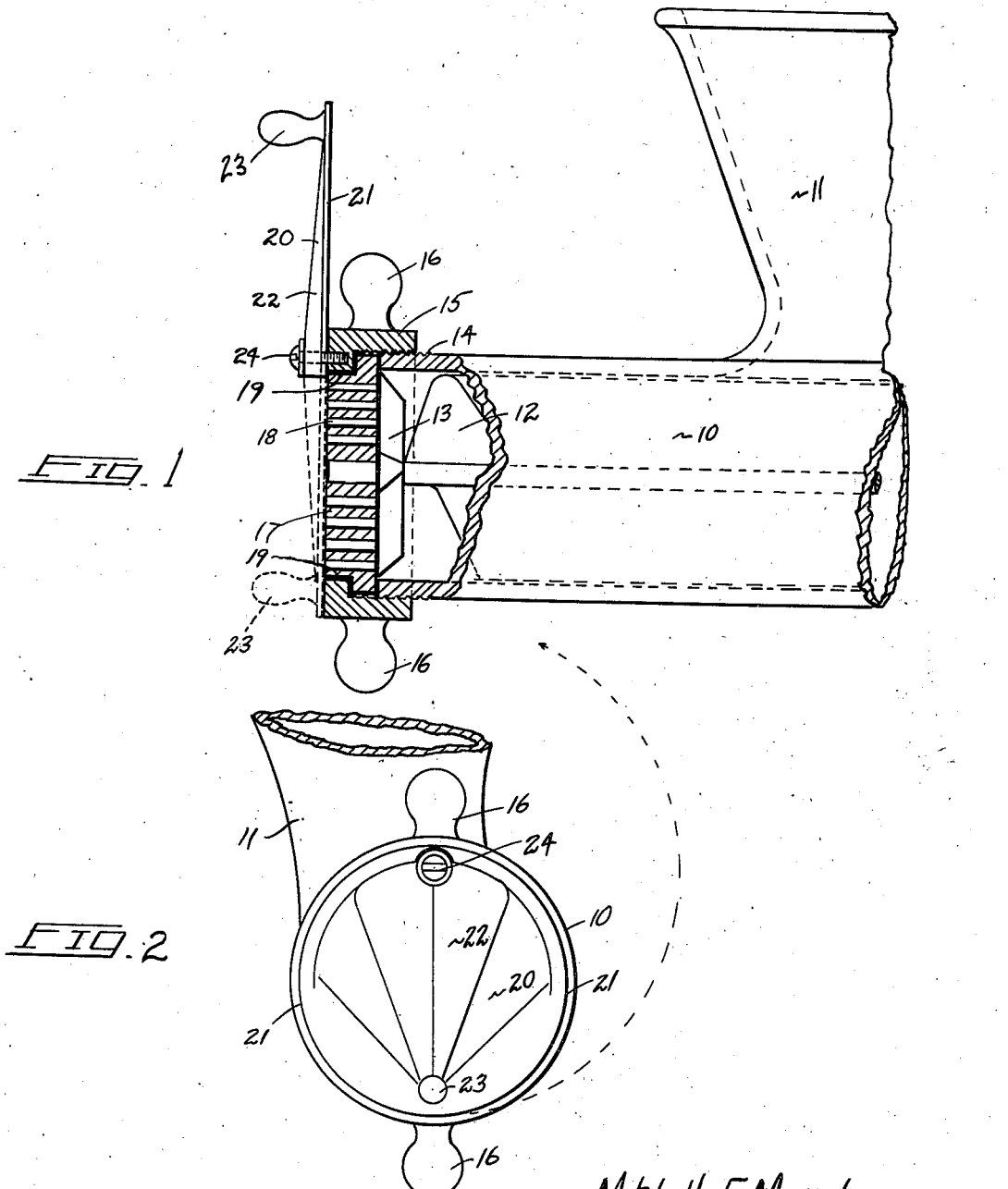
Mitchell F. Majestic
Inventor
By W. B. Harpman
Attorney Patented Mar. 24, 1942

2,277,123

UNITED STATES PATENT OFFICE 2,277,123

CLOSURE FOR MEAT GRINDER

Mitchell F. Majestic, Youngstown, Ohio

Application January 11, 1941, Serial No. 374,024

4 Claims. (Cl. 146—182)

This invention relates to an attachment for a meat grinder and more particularly to an attachment that takes the form of a pivoted closure adapted to cover delivery orifices of a meat grinder such as is commonly used in the various butcher shops for the grinding of meats.

The principal object of the invention is the provision of a sanitary closure for a meat grinder.

A further object of the invention is the provision of a closure incorporating means for removing meat particles adhering to the delivery face of the meat grinder.

A still further object of the invention is the provision of a closure attachment for a meat grinder designed to present a clean and attractive appearance at such times as the meat grinder is not in use and at the same time prevent insects and other undesirable articles from coming in contact with the bits of meat commonly protruding from the grinder delivery face.

The meat grinder attachment shown and described herein comprises a sanitary closure formed on and made a part of a more or less conventional meat grinder cap which is well known in the art as comprising a threadable member positioned on the delivery end of a meat grinder commonly employed for holding the delivery face die in place against which a revolving knife of the meat grinder operates and through a plurality of openings in which the ground meat is extruded when the meat grinder is in operation.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed without departing from the spirit of the invention.

The invention is illustrated in the accompanying drawing wherein:

Figure 1 is a side elevation of a portion of a meat grinder, with parts broken away, showing the sanitary closure attachment positioned thereon. Solid lines indicate the closure member in open position as for the delivery of meat, and dotted lines indicate the closure in closed position effecting a sanitary cover for the meat delivery portions of the grinder.

Figure 2 is an end elevation of a portion of the meat grinder shown in Figure 1 and shows the closure member in closed position completely covering the meat delivery surface of the grinder.

By referring to the drawing and Figure 1 in particular it will be seen that a meat grinder comprising a tubular body 10 having a hopper 11 mounted thereon for the reception of meat, is provided with a conventional proceeding screw 12 and a conventional cutting knife 13 which portions of the grinder are adapted to be driven by a suitable power source usually contained in the base portion of the grinder and which is not shown as it does not comprise a portion of this invention. The tubular body portion 10 of the grinder is provided at its forward or delivery end thereof with a threaded surface 14 upon which a cap 15 is adapted to be threadably engaged. The cap 15 is provided with oppositely disposed lugs 16 to facilitate the easy application of or removal of the cap from the meat grinder. The cap 15 is provided to hold in operative position a meat delivery die 17 in operative relation to the knife 13. The meat delivery die 17 is provided with a plurality of relatively small openings 18 through which the meat is forced. This, in connection with the knife 13, results in the reduction of the meat placed into the grinder into small portions commonly known as ground meat. In the present invention the meat delivery die 17 comprises a slightly different structure than as is commonly known to the art in that the die has been thickened and provided with an annular shoulder 19 of reduced diameter as compared with the largest diameter of the die. The diameter of the annular shoulder 19 is approximately that of the opening in the cap 15 with which it registers so that its outermost surface is on a plane with the outermost surface of the cap 15. Pivoted to the cap 15 as shown in open position by solid lines in Figure 1 of the drawing, there is a closure plate 20 which is provided with a knife like edge 21 and suitable ribbing 22 to lend structural strength to the closure plate. A handle 23 is also provided and the pivot means preferably comprises a bolt 24 threadably engaging a threaded opening in the cap 15. A spring washer is preferably positioned between the head of the bolt 24 and the closure plate 20 in order to provide continuous tension upon the closure plate 20 to insure its accurate and positive severing of the meat particles protruding from the face of the meat delivery die 17. Dotted lines on Figure 1 show the closure plate in closed position, it being obvious that any meat particles protruding from the surface of the meat delivery die 17 will have been sheared off by the knife edge 21.

By referring to Figure 2 of the drawing, an end elevation of the meat grinder may be seen wherein the details of the structural ribbing 22 providing on the closure plate 20 may be seen. The closure plate is shown in Figure 2 in closed position.

It will thus be seen that a means of effecting a sanitary cover for the meat delivery surfaces of a meat grinder has been devised and that the invention resides in the combination of the meat delivery die and cap forming a surface of even plane, and a knife edged closure plate pivoted to the cap in a manner making it possible to not only cover the meat delivery orifices but shear off the protruding meat particles in doing so. The meat grinder so equipped is thus actually cleaner due to the protection of the meat in the delivery orifices thereof and at the same time offers a greatly improved appearance as compared with the forms of the device heretofore known to the art.

What I claim is:

1. The combination with a meat grinder having a perforated meat delivery die, of a disk like knife adapted to cut off meat protruding from said meat delivery die and form a closure therefore, said disk like knife pivoted to said grinder at one side of the said die.

2. The combination of a meat grinder having a perforated meat delivery die, and a disk like knife adapted to cut off meat protruding from said meat delivery die and form a closure for said die, said disk like knife attached to said grinder by means of a pivot member, spring means positioned between said pivot member and the said disk like knife so as to normally urge the said disk like knife against the said meat delivery die.

3. The combination of a meat grinder having a perforated disk like face on a plane with the retaining screw ring thereof, and a knife edged closure member pivoted to said retaining screw ring and adapted to cut off matter protruding from the said disk like face and also form a closure for the disk face of the grinder.

4. The combination of a meat grinder provided with a die having a plurality of meat delivery openings formed therein and an attachment comprising a cap ring adapted to threadably engage the meat grinder, a knife edged closure plate pivotally mounted on said cap ring and adapted to slidably engage the meat delivery surfaces of the said die so as to cover the same and simultaneously cut off and remove meat protruding therefrom.

MITCHELL F. MAJESTIC.